(12) United States Patent
Hada et al.

(10) Patent No.: US 8,259,595 B2
(45) Date of Patent: Sep. 4, 2012

(54) METHOD AND SYSTEM FOR DIAGNOSING EXTERNAL SIGNAL INPUT/OUTPUT UNITS

(75) Inventors: Kouji Hada, Yamanashi (JP); Hiroshige Ando, Yamanashi (JP); Hiroshi Noda, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 637 days.

(21) Appl. No.: 12/000,424

(22) Filed: Dec. 12, 2007

(65) Prior Publication Data

US 2008/0144517 A1   Jun. 19, 2008

(30) Foreign Application Priority Data

Dec. 18, 2006   (JP) .................................. 2006-340003

(51) Int. Cl.
   *G01R 31/08*   (2006.01)
(52) U.S. Cl. .................... 370/249; 379/22.01; 379/27.05
(58) Field of Classification Search .................. 370/249; 379/27.05, 22.01, 27.03
   See application file for complete search history.

(56) References Cited

U.S. PATENT DOCUMENTS

| | | | |
|---|---|---|---|
| 6,169,262 B1 * | 1/2001 | Lee et al. .................... | 219/69.13 |
| 2006/0198239 A1 * | 9/2006 | Zehentner ...................... | 365/241 |
| 2006/0259259 A1 * | 11/2006 | Rozenboim et al. ............ | 702/83 |

FOREIGN PATENT DOCUMENTS

| | | |
|---|---|---|
| DE | 265 019 | 2/1989 |
| DE | 196 49 980 | 6/1998 |
| DE | 199 28 984 | 12/2000 |
| JP | 4-143804 | 5/1992 |
| JP | 4-306029 | 10/1992 |
| JP | 7-219628 | 8/1995 |
| JP | 2005-025260 | 1/2005 |

OTHER PUBLICATIONS

Japanese Notice of Reasons for Rejection mailed Sep. 9, 2008 issued in Japanese Application No. 2006-340003 (including a partial translation thereof).

* cited by examiner

*Primary Examiner* — Anh-Vu Ly
*Assistant Examiner* — Matthew Hopkins
(74) *Attorney, Agent, or Firm* — Drinker Biddle & Reath LLP

(57) ABSTRACT

Each of the host transmitting/receiving blocks of a plurality of I/O units connected to a CNC reads the destination specification data and a diagnostic result bit each time the host transmitting/receiving block receives a signal packet from the CNC. When the diagnostic result bit indicates the execution of a diagnosis, the signal packet contains diagnostic DO data, and the relevant DO signal output terminal is short-circuited to the relevant DI signal input terminal to form a diagnostic loop. The diagnostic packet signal passes through the diagnostic loop, the external signal transmitting/receiving block, and the host transmitting/receiving block and returns to the CNC through the host transmitting/receiving block of an adjacent I/O unit closer to the CNC. The CNC analyzes the packet signal to determine whether each of the I/O units is operating normally or not.

8 Claims, 2 Drawing Sheets

METHOD AND SYSTEM FOR DIAGNOSING EXTERNAL SIGNAL INPUT/OUTPUT UNITS

BACKGROUND OF THE INVENTION

1. Field of the Invention

The present invention relates to a method and a system for checking (diagnosing) the states of a plurality of external signal input/output units (I/O units) used when automated machines such as machine tools are controlled by a numerical controller.

2. Description of the Related Art

As is well known, when automated machines such as machine tools are controlled by a numerical controller, various external signals are input or output. An external signal input/output unit used to input or output such external signals is called an I/O unit. The external signals input to or output from an automated machine through an I/O unit include, when the automated machine is a machine tool for example, a start signal, a synchronization signal for each servo axis, a reset signal, an override signal, an emergency stop signal, and other signals. These signals are directly related to safety, so a fault that occurs in the I/O unit needs to be detected immediately.

A typical method conventionally used is to check whether the I/O unit is operating normally by periodically operating a self-diagnostic circuit provided in the I/O unit. FIG. 2 is a block diagram showing an overview of an I/O unit with a diagnostic circuit in which this method is applied.

In FIG. 2, the I/O unit A1 has a host transmitting/receiving block 11, which controls the exchange of signals with the numerical controller 1 (CNC) and with another I/O unit A2, an external signal transmitting/receiving block 12, and a diagnostic circuit 13. The external signal transmitting/receiving block 12 is connected to an output line 21 via a contact C1, an input line 22 via a contact C4, a diagnostic loop line 23 via a contact C2, and another diagnostic loop line 24 via a contact C3. The output line 21 and the input line 22 are connected to an automated machine M1 for which the I/O unit A1 provides input and output.

Of the contacts C1 to C4, the contact C1 connected to the external signal output line 21 and the contact C4 connected to the external signal input line 22 are normally closed and remain closed (electrically connected) unless commanded to open by the diagnostic circuit 13. These contacts C1 to C4 are opened (electrically disconnected) when a diagnosis start signal is output from the diagnostic circuit 13, and are closed (electrically connected) when a diagnosis end signal is output from the diagnostic circuit 13. The contacts C2 and C3 connected to the diagnostic loop lines 23 and 24 are normally open, are closed (electrically connected) when the diagnosis start signal is output from the diagnostic circuit 13, and are opened (electrically disconnected) when the diagnosis end signal is output from the diagnostic circuit 13.

In general, the I/O unit A1 is diagnosed periodically. For this purpose, the I/O unit A1 has a timer (not shown) set to trigger the diagnostic circuit 13 at certain intervals (for example, intervals of 10 minutes). First, the diagnosis start signal is output from the diagnostic circuit 13, opening contacts C1 and C4 and closing contacts C2 and C3. Next, the diagnostic circuit 13 transmits an output diagnostic signal (a prescribed digital signal packet) to the external signal transmitting/receiving block 12 and checks whether or not the transmitted signal is successfully returned to the diagnostic circuit 13 through the closed contact C2 and diagnostic loop line 23.

In addition, the diagnostic circuit 13 transmits an input diagnostic signal (another prescribed digital signal packet) to the external signal transmitting/receiving block 12 through diagnostic loop line 24 and the closed contact C3 and checks whether or not the transmitted signal is successfully returned to the diagnostic circuit 13. If a failure occurs during either input or output, the operator is informed by suitable means (for example, a beeper).

The input line 22 and output line 21 are connected to the automated machine M1 (for example, a machine tool) that is to be controlled, and when the unit is not being diagnosed, various external signals such as the servo axis synchronization signals, reset signal, override signal, and emergency stop signal are transmitted or received through the closed contacts C1 and C4. In the example shown in FIG. 2, the host transmitting/receiving block 11 is connected to the CNC 1 and the host transmitting/receiving block of another I/O unit A2, which has the same structure as I/O unit A1.

In a system in which a plurality of machine tools are controlled by one CNC, when, for example, I/O units A1 to A5 are connected to respective machine tools (more generally, automated machines) M1 to M5 as shown in FIG. 1, the host transmitting/receiving block of I/O unit A1 is connected to the CNC and the host transmitting/receiving block of I/O unit A2 as described above. In addition, a mutual connection is made between the host transmitting/receiving blocks of I/O units A2 and A3, between the host transmitting/receiving blocks of I/O units A3 and A4, and between the host transmitting/receiving blocks of I/O units A4 and A5.

Reference characters B1 to B3 indicate external units (such as robots or machine tools other than M1 to M5) connected to the CNC; signals from these external units may also be transmitted to each of the I/O units A1, A2, . . . through the CNC. These signals are also a type of external signal. In general, external signals are any automated machine control signals other than servo control signals. As is well known, signals (such as servo control signals and feedback signals) for servo control of each axis of the automated machines M1 to M5 are transmitted to and received from the automated machines M1 to M5 directly, bypassing the I/O units A1 to A5.

With the connections shown in FIG. 1, during normal communication (when no diagnosis is being made), external signals generated inside the CNC or passed from an external signal source (one of the external units B1 to B3) to the CNC are forwarded to the I/O units A1, A2, A3, A4, and A5 in sequence; each external signal is selectively received by the host transmitting/receiving block of the I/O unit that needs the external signal, and the received external signal is output to the corresponding machine tool of M1 to M5 through the output line.

An external signal output from one of machine tools M2 to M5 to the corresponding one of I/O units A2 to A5 is forwarded in sequence through the other I/O units on the CNC side to the CNC. An external signal output from machine tool M1 to the corresponding I/O unit A1 is directly transmitted to the CNC.

As shown in this example, when a plurality of I/O units are used, hitherto it has been necessary to install a diagnostic circuit of the type described above in each I/O unit to make the necessary operational checks of the I/O unit. That is, in the prior art a diagnostic circuit is required for each I/O unit, regardless of the number of I/O units, so the system becomes complicated and expensive.

A simple solution to this problem is not to be found in the known literature. Japanese Patent Application Laid-Open No. 2005-25260 proposes technology to provide security for a unit used to input or output safety signals, but the proposed technology is a redundant signal transmission circuit that provides security in case of a local failure; no technology is disclosed that diagnoses I/O units without installing a diagnostic circuit in each of the I/O units.

SUMMARY OF THE INVENTION

An object of the present invention is to provide technology for enabling I/O units to be diagnosed without installing a diagnostic circuit in each of the I/O units, even when a numerical controller uses a plurality of I/O units to control automated machines such as machine tools. The present invention solves the above problem by using the numerical controller itself to check whether the internal circuits of the I/O units are operating normally or not.

In the present invention, the diagnostic method of checking whether external signal input/output units are operating normally or not is carried out in a system in which a plurality of external signal input/output units, each of which has an external signal output line and an external signal input line, are connected to a numerical controller that controls automated machines. The diagnostic method comprises step of transmitting a diagnostic signal from the numerical controller to each of the external signal input/output units, step of returning the diagnostic signal, received by the external signal input/output unit, to the numerical controller through a loop formed by an input line to and an output line from the external signal input/output unit, and step of checking whether the external signal input/output unit is operating normally or not based on the diagnostic signal returned to the numerical controller.

The step of transmitting the diagnostic signal to each external signal input/output unit, the step of returning the diagnostic signal to the numerical controller, and the step of checking whether the external signal input/output unit is operating normally or not may be repeated periodically.

The automated machines may be machine tools. In the present invention, the external signal input/output unit diagnostic system comprises automated machines, a numerical controller that controls the automated machines, a plurality of external signal input/output units connected to the numerical controller, each of which has an external signal output line and an external signal input line, and a diagnostic means for checking whether each of the external signal input/output units is operating normally or not. The numerical controller has a diagnostic signal transmission means for transmitting a diagnostic signal to each of the external signal input/output units; each of the external signal input/output units has a diagnostic signal return means for receiving the diagnostic signal transmitted by the diagnostic signal transmission means and returning the diagnostic signal to the numerical controller through a loop formed by an input line to and an output line from the external signal input/output unit. The diagnostic means is provided in the numerical controller and checks whether each of the external signal input/output units is operating normally or not based on the diagnostic signal returned by the diagnostic signal return means to the numerical controller.

The diagnostic signal transmission means may transmit the diagnostic signal to each of the external signal input/output units repeatedly in a periodic manner.

The automated machines may be machine tools.

In the present invention, as a numerical controller is used to check whether the internal circuit of an I/O unit is operating normally or not, no diagnostic circuit is required in the I/O unit, thereby simplifying the structure of the I/O unit. This arrangement is also economically advantageous. When a plurality of I/O units are present, although they lack individual diagnostic circuits, the I/O units can be diagnosed by one CNC, thereby simplifying the system structure and providing further economic advantage.

BRIEF DESCRIPTION OF THE DRAWINGS

The above and other objectives and features of the present invention will become apparent from the following description of preferred embodiments thereof with reference to the accompanying drawings, in which.

DETAILED DESCRIPTION OF THE PREFERRED EMBODIMENTS

Figure 3A:
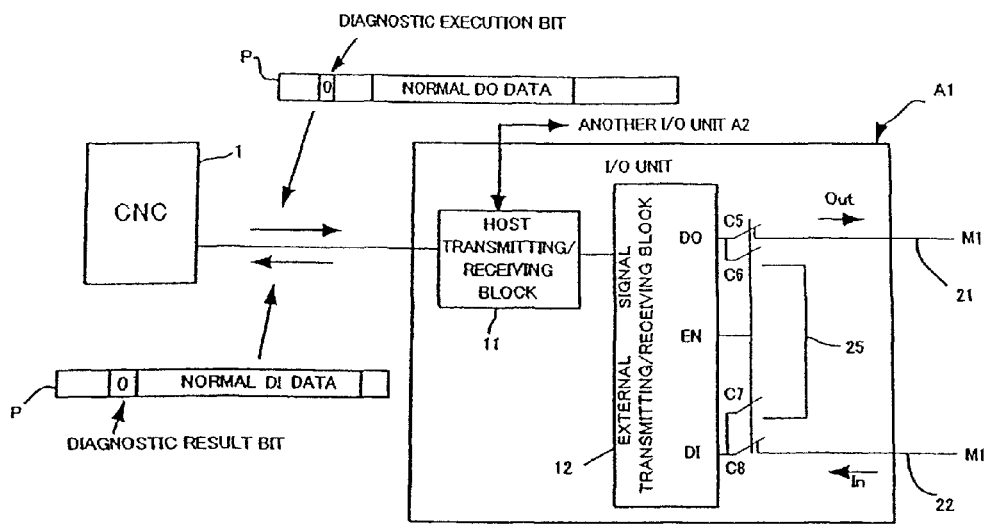
FIG. 3A is a block diagram illustrating an embodiment of the inventive external signal input/output unit diagnostic system when the external signal input/output unit is performing normal communication (or is not being diagnosed).
Figure 3B:
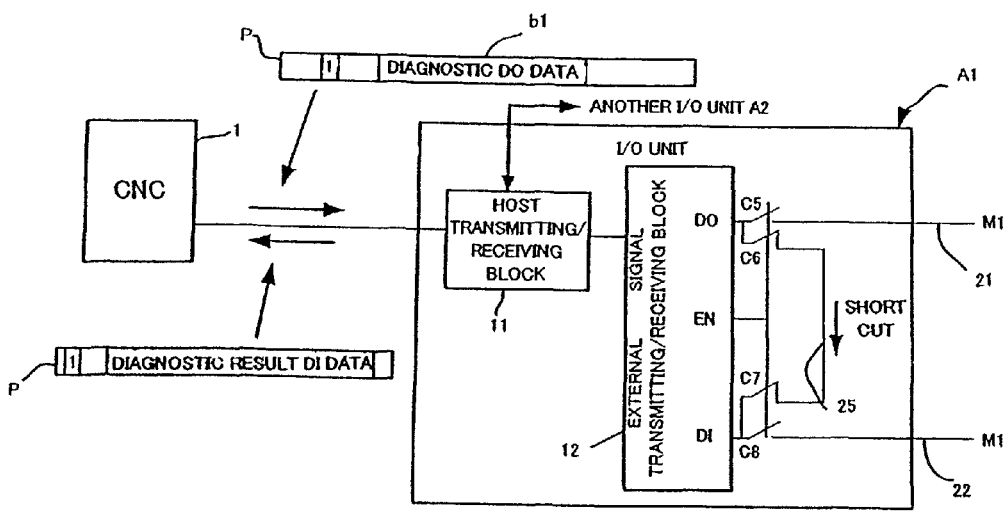
FIG. 3B illustrates the state of the external signal input/output unit in FIG. 3A during diagnosis.

An I/O unit embodying the present invention is shown in its state during normal communication in FIG. 3A, and in its diagnostic state in FIG. 3B.

In FIGS. 3A and 3B, I/O unit A1 has a host transmitting/receiving block 11, which transmits signals to and receives signals from a numerical controller (CNC) 1, and an external signal transmitting/receiving block 12. The I/O unit A1 differs from the conventional I/O unit A1 in FIG. 2 in that the I/O unit A1 has no diagnostic circuit.

The external signal transmitting/receiving block 12 is connected to an output line 21 via a contact C5, an input line 22 via a contact C8, and a diagnostic loop line 25 via two contacts C6 and C7. The input line 21 and the output line 22 are connected to an automated machine M1 for which I/O unit A1 provides input and output.

Of the contacts C5 to C8, the contact C8 connected to the external signal input line 22 is normally closed; it remains closed (electrically connected) as shown in FIG. 3A during normal communication (when the unit is not being diagnosed), is opened (electrically disconnected) as shown in FIG. 3B during a diagnosis, and is closed (electrically connected) again when the diagnosis is completed. The contact C5 for the output line may be opened (electrically disconnected) or closed (electrically connected) during the diagnosis. The contacts C6 and C7 provided on the diagnostic loop line are normally open; they remain opened (electrically disconnected) as shown in FIG. 3A during normal communication (when the unit is not being diagnosed), are closed (electrically connected) as shown in FIG. 3B during a diagnosis, and are opened (electrically disconnected) again when the diagnosis is completed.

During normal communication (when the unit is not being diagnosed), as shown in FIG. 3A, external signals such as servo axis synchronization signals, a reset signal, an override signal, and an emergency stop signal are transmitted or received, through the closed contacts C5 and C8, on the input line 22 and output line 21 connected to the automated machine M1 (such as a machine tool) to be controlled. The present invention contemplates the connection of a plurality of I/O units to one CNC; the host transmitting/receiving block 11 of the I/O unit A1 next to the CNC is generally connected both to the CNC and to the host transmitting/receiving block of the I/O unit A2 connected adjacent to I/O unit A1, as indicated in FIGS. 3A and 3B.

The system shown earlier in FIG. 1 will be taken as an example of a system structure in which a plurality of I/O units are connected to one CNC. As described before, in this system structure, the I/O units A1 to A5 are connected to respective machine tools (or, more generally, automated machines) M1 to M5 and, as described above, the host transmitting/receiving block 11 of I/O unit A1 is connected to the CNC 1 and the host transmitting/receiving block of I/O unit A2.

Figure 2:
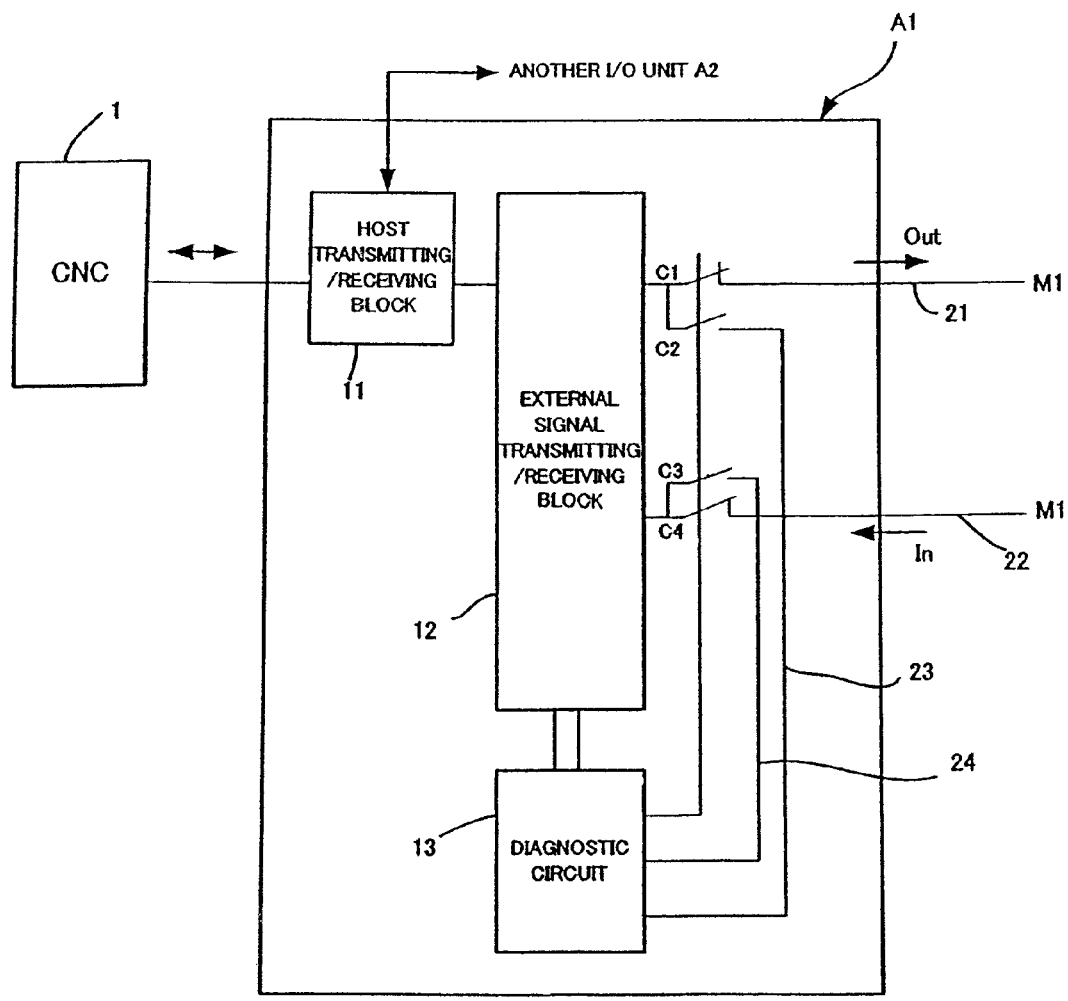
FIG. 2 is a block diagram showing an example of a conventional I/O unit.

In addition, there are mutual connections between the host transmitting/receiving blocks of I/O units A2 and A3, between the host transmitting/receiving blocks of I/O units A3 and A4, and between the host transmitting/receiving blocks of I/O units A4 and A5. The block structure and functions of I/O units A2 to A4 are the same as those of I/O unit A1 as illustrated in FIG. 2, except for the connections related to the host transmitting/receiving blocks. Reference characters B1 to B3 indicate external units (such as robots or machine tools other than M1 to M5) connected the CNC.

In the I/O unit A1 shown in FIGS. 3A and 3B, as in the I/O unit A1 shown in FIG. 2, signals (external signals) from the external units B1 to B3 may be transmitted to the I/O units A1, A2, ... through the CNC 1; the signals (such as servo control signals and feedback signals) for servo control of the axes of the automated machines M1 to M5 bypass the I/O units A1 to A5 and are transmitted to or received from the automated machines M1 to M5 directly.

Figure 1:
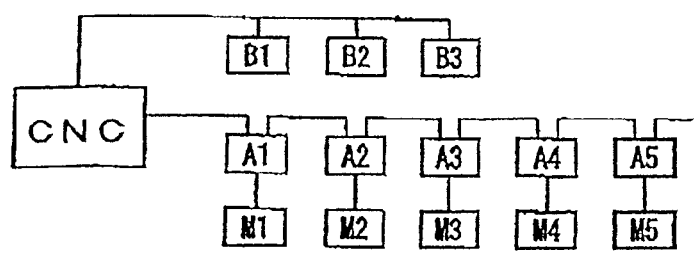
FIG. 1 illustrates connections between a numerical controller, automated machines, I/O units, and external signal sources.

With the connections shown in FIG. 1, during normal communication (when no diagnosis is being made), an external signal generated inside the CNC 1 or passed from an external signal source (one of the external units B1 to B3) to the CNC 1 is forwarded through the I/O units A1, A2, A3, A4, and A5 in sequence and selectively received by the host transmitting/receiving block of the I/O unit that needs the external signal, and the received external signal is output to the corresponding machine tool M1, M2, M3, M4, or M5 through the output line.

External signals output from machine tools M2 to M5 to the corresponding I/O units A2 to A5 are forwarded in sequence by the other I/O units on the CNC 1 side to the CNC 1. For example, an external signal output from machine tool M4 to the corresponding I/O unit A4 is transmitted to the CNC 1 through the host transmitting/receiving blocks of I/O units A3, A2, and A1. An external signal output from machine tool M1 to the corresponding I/O unit A1 is directly transmitted to the CNC 1.

In this embodiment, the external signals input to or output from the machine tools (more generally, automated machines) through the I/O units A1 to A5 as explained above are digital signals, which are input or output and then transmitted as signal packets p. Each signal packet p has a diagnostic result bit, as shown in FIGS. 3A and 3B. The diagnostic result bit is 0 for normal communication (when a diagnosis is not being made) and 1 for a diagnosis. Data (destination specification data) for identifying the destination I/O unit is written in the header section of the packets p output from the CNC 1.

The destination specification data and the diagnostic result bit (0 or 1) are read each time the host transmitting/receiving block of each I/O unit receives a packet p. If the destination is the I/O unit that receives the packet p and the diagnostic result bit is 0, the packet p contains normal DO (digital output) data and is passed to the external signal transmitting/receiving block in that I/O unit. The external signal transmitting/receiving block outputs the packet to the output line leading through contact C5 (which is in the closed state).

If the destination is an I/O unit located on the downstream side, as seen from the CNC 1, the packet p is forwarded to the host transmitting/receiving block of the adjacent downstream I/O unit. For example, if the destination is I/O unit A1 and the diagnostic result bit is 0, the packet p is passed to the external signal transmitting/receiving block 12 of I/O unit A1, as shown in FIG. 3A. The external signal transmitting/receiving block 12 outputs the packet to automated machine M1 on the output line leading through contact C5 (which is in the closed state).

If, as another example, the destination is I/O unit A3, the packet p is forwarded to the host transmitting/receiving block of I/O unit A2 regardless of the value of the diagnostic result bit. I/O unit A2 evaluates the received packet p in the same way and forwards it to the host transmitting/receiving block of the next I/O unit A3. Since the destination is I/O unit A3, I/O unit A3 receives the packet p.

If its diagnostic result bit is 0, the packet p is passed to the external signal transmitting/receiving block of the I/O unit A3. (I/O units A1 to A5 have the same structure and functions, except for the connection destination of the host transmitting/receiving block.) The external signal transmitting/receiving block of I/O unit A3 outputs the packet to automated machine M3 on the output line leading through contact C5 (which is in the closed state).

The host transmitting/receiving block of each I/O unit thus reads the destination specification data and the diagnostic result bit (0 or 1) each time it receives a packet p. If the destination is its own I/O unit and the diagnostic result bit is 0, the packet p contains normal DO (digital output) data and is passed to the external signal transmitting/receiving block in its own I/O unit. The external signal transmitting/receiving block outputs the packet on the output line leading through contact C5 (which is in the closed state).

External signals output from the automated machines M1 to M5 are treated in the same way. That is, external signals are processed in the form of packets p and, as shown in FIG. 3A, the diagnostic result bit and the data (source specification data) for identifying the automated machine of M1 to M5 that output the signal are written in the packet p together with normal DI (digital input) data. No diagnostic signals are output from the automated machines M1 to M5, so the diagnostic result bit is always 0.

The flow of external signals output from the automated machines M1 to M5 can be illustrated as follows. An external signal output from automated machine M4 is passed to the external signal transmitting/receiving block of I/O unit A4 through the input line and contact C8 of I/O unit A4. The external signal transmitting/receiving block passes this signal to the host transmitting/receiving block of I/O unit A4. The host transmitting/receiving block forwards the signal to I/O unit A3, which is the adjacent I/O unit closer to the CNC. The signal is further transmitted to the CNC 1 through the host transmitting/receiving blocks of I/O unit A2 and I/O unit A1.

To carry out a diagnosis, as shown in FIG. 3B, the CNC 1 first transmits a packet p with the diagnostic bit set to 1, instead of a packet p for normal I/O data transmission/reception, to each of the I/O units A1 to A5. When the host transmitting/receiving block of each of the I/O units receives the packet p, it short-circuits the DO line (output line) to the DI line (input line) at the input and output terminals of the DO and DI signals on the external signal transmitting/receiving block. In this embodiment, an EN control pin that controls the contacts C5 to C8 is used to open contacts C5 and C8 and close contacts C6 and C7 simultaneously. In this case, the contact C5 may be left closed.

A packet p with the diagnostic result bit set to 1 contains diagnostic DO data. The diagnostic packet p is returned to the external signal transmitting/receiving block 12 through the diagnostic loop formed by the above short circuit. The external signal transmitting/receiving block 12 passes the returned packet p to the host transmitting/receiving block 11. The host transmitting/receiving block 11 passes it directly (in case of I/O unit A1) or through the host transmitting/receiving block of the adjacent I/O unit closer to the CNC 1 (in case of I/O units A2 to A5) to the CNC 1 as diagnostic result DI data. The diagnostic loop formed by the above short circuit is removed (contacts C5 and C8 are closed and contacts C6 and C7 are opened by the control pin for contacts C5 to C8) immediately after the packet p containing the diagnostic result DI data passes through.

The CNC 1 incorporates error detection software, which is used by the CPU (not shown) of the CNC 1 to determine the presence or absence of a failure. If a failure occurs in any of the I/O units, an operator is informed of the failure by suitable means (for example, a beeper). The diagnostic result of any one of I/O units to be represented by the diagnostic result DI data (packet data) which the CNC 1 receives when carrying out diagnosis is identified by the destination data written in the header contained in the diagnostic packet which is output from the CNC 1. This is because the host transmitting/receiving blocks of the I/O units A1 to A5 do not receive packets p addressed to other I/O units or pass them to the external transmitting/receiving block, and because the destination data is not deleted when the packet p is returned to the CNC 1 through the diagnostic loop.

There is no particular restriction on the failure detection algorithm used in the CNC; various algorithms can be considered. For example, one possible method is to check if a value with a prescribed number of binary digits is returned unchanged to the CNC 1 within a certain period of time. The intervals at which the diagnosis is performed can preferably be changed by the CNC operation unit. Exemplary intervals are once per minute and once every 10 minutes.

A diagnosis may be performed anytime manually from the operation unit. The automated machines M1 to M5 are typically machine tools, but are not limited to machine tools provided they are controlled by the CNC 1 and require the input and output of external signals; for example, the CNC 1 may be a robot controller and the automated machines may be robots. The above embodiment uses five automated machines, but there is no particular restriction on the number provided there are two or more automated machines.

The invention claimed is:

1. A diagnostic method for checking whether a plurality of external signal input/output units are operating normally or not, with no diagnostic circuit provided to the external signal input/output unit, in a system in which the plurality of external signal input/output units, each of which has an external signal output line and an external signal input line, are connected to a numerical controller to control automated machines, comprising the steps of:
    transmitting a diagnostic signal from the numerical controller to each of the external signal input/output units;
    returning the diagnostic signal, received by the external signal input/output unit, to the numerical controller through a loop formed by short-circuiting an input line to and an output line from the external signal input/output unit at input and output terminals of digital output (DO) and digital input (DI) signals on an external signal transmitting/receiving block; and
    checking whether the external signal input/output unit is operating normally or not based on the diagnostic signal returned to the numerical controller,
    wherein an identification is made of the source of the diagnostic signal returned to the numerical controller which the numerical controller receives when carrying out diagnosis so that it can be determined from which one of the external signal input/output units connected to the numerical controller the diagnostic signal has been returned to the numerical controller.

2. The diagnostic method according to claim 1, wherein the steps of transmitting the diagnostic signal to each external signal input/output unit, returning the diagnostic signal to the numerical controller, and checking whether the external signal input/output unit is operating normally or not, are repeated periodically.

3. The diagnostic method according to claim 1, wherein the automated machines are machine tools.

4. The diagnostic method according to claim 1, wherein the loop formed by said short circuiting is removed immediately after a packet containing the diagnostic signal passes through the loop.

5. A system having automated machines, a numerical controller for controlling the automated machines, a plurality of external signal input/output units connected to the numerical controller, each of the external signal input/output units having an external signal output line and an external signal input line, and a diagnostic means for checking whether each of the external signal input/output units is operating normally or not, with no diagnostic circuit provided to the external signal input/output unit, wherein;
    the numerical controller has a diagnostic signal transmission means for transmitting a diagnostic signal to each of the external signal input/output units,
    each of the external signal input/output units has a diagnostic signal return means for receiving the diagnostic signal transmitted by the diagnostic signal transmission means and returning the diagnostic signal to the numerical controller through a loop formed by short-circuiting an input line to and an output line from the external signal input/output unit at input and output terminals of digital output (DO) and digital input (DI) signals on an external signal transmitting/receiving block,
    the diagnostic means is provided in the numerical controller and checks whether each of the external signal input/output units is operating normally or not based on the diagnostic signal returned by the diagnostic signal return means to the numerical controller, and
    an identification is made of the source of the diagnostic signal returned to the numerical controller which the numerical controller receives when carrying out diagnosis so that it can be determined from which one of the external signal input/output units connected to the numerical controller the diagnostic signal has been returned to the numerical controller.

6. The system according to claim 5, wherein the diagnostic signal transmission means transmits the diagnostic signal to each of the external signal input/output units repeatedly in a periodic manner.

7. The system according to claim 5, wherein the automated machines are machine tools.

8. The system according to claim 5, wherein the loop formed by said short circuiting is removed immediately after a packet containing the diagnostic signal passes through the loop.

* * * * *